Nov. 19, 1968  W. M. HERPICH  3,411,396

SCREW HEAD WITH INCLINED DRIVING RECESS

Filed Dec. 22, 1966  2 Sheets-Sheet 1

INVENTOR
WILLIAM M. HERPICH

BY Mason, Porter, Diller & Brown
ATTORNEYS

Nov. 19, 1968 W. M. HERPICH 3,411,396
SCREW HEAD WITH INCLINED DRIVING RECESS
Filed Dec. 22, 1966 2 Sheets-Sheet 2
FIG.5
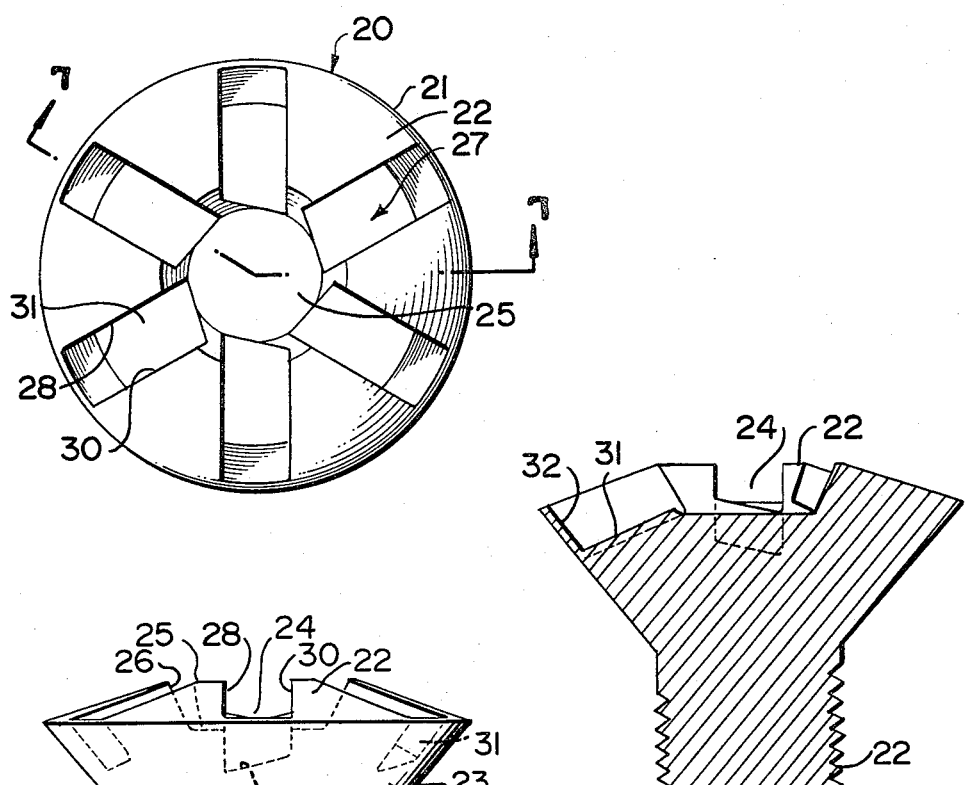
FIG.7
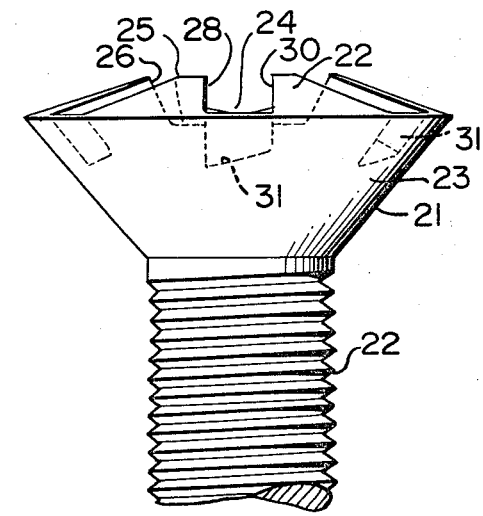
FIG.6
INVENTOR
WILLIAM M. HERPICH
ATTORNEYS United States Patent Office 3,411,396
Patented Nov. 19, 1968

3,411,396
SCREW HEAD WITH INCLINED DRIVING RECESS
William M. Herpich, Litchfield, Conn., assignor to The Torrington Company, Torrington, Conn., a corporation of Connecticut
Continuation-in-part of application Ser. No. 529,072, Feb. 21, 1966. This application Dec. 22, 1966, Ser. No. 603,949
17 Claims. (Cl. 85—45)

ABSTRACT OF THE DISCLOSURE

A screw having a head with channels therein. The channels are provided with bottom surfaces which are inclined both radially and circumferentially to facilitate transmitting greater driving or tightening torque than removal torque, through the screw head through the screw shank.

---

This is a continuation-in-part of application Ser. No. 529,072 filed Feb. 21, 1966, now abandoned.

Accordingly, it is the primary object of this invention to provide a novel screw head which is centrally recessed to provide non-slip and non-skid features when driven, but has slots which slope radially outwardly toward the base of the screw head in order to permit high torque transmission from a driving tool to the screw shank.

It is another object of this invention to provide a novel screw head, capable of high torque transmission, which is self-centering and capable of being driven when the axis of a driving instrument is not aligned with the axis of the screw, and which conforms to standard screw head dimensions.

It is still another object of this invention to provide a screw having a head comprising multiple driving surfaces defined by channels, the lower surfaces of which slope radially outwardly toward the base of the screw head, and also slope circumferentially in the direction of screw drive to enable a driving torque in excess of the strength of the screw shank to be transmitted by the screw head without cam-out of the driving tool.

It is another object of this invention to provide a screw head having multiple driving surfaces defined by channels, whereby the screw head is of the generally countersunk variety, having a generally conical undersurface adjacent the shank, whereby each of the channels is defined by upstanding sidewalls and a bottom surface, the bottom surface sloping generally radially outwardly and downwardly and also circumferentially between the sidewalls, whereby the head impression does not penetrate into the shank of the screw to weaken the screw at the junction of the head and shank.

It is a further object of this invention to provide a novel screw head, capable of high torque transmission, which is self-centering and capable of being driven when the axis of a driving instrument is not accurately aligned with the axis of the screw, but which can be driven also by conventional blade-type screw drivers, comprising a plurality of equidistantly circumferentially spaced slots or channels on an upper surface thereof, whereby each of the channels has a bottom surface having a compound slope, the slope being radially outwardly and downwardly with respect to an upper surface of the screw head, and circumferentially transversely of the channel, such that a greater channel sidewall surface area is presented to a driving tool during a driving operation.

With the above and other objects in view that will hereinafter appear, the nature of the invention will be more clearly understood by reference to the following description, the appended claims, and the several views illustrated in the accompanying drawing.

In the drawing:

FIGURE 5 is a plan view of the head of another screw of this invention, wherein there is illustrated a central depression and six radial torque-transmitting channels, each of the channels terminating in channel end walls at their radial outermost portions.

FIGURE 6 is a fragmentary elevational view of the counter-sunk head screw of this invention illustrated in FIGURE 5, wherein the conical screw head undersurface is best illustrated.

FIGURE 7 is a fragmentary vertical sectional view of the screw of FIGURE 5, taken along the line 7—7 of FIGURE 5, and wherein there is illustrated the bottom surfaces of the driving channels sloping radially outwardly and downwardly toward the shank of the screw.

Figure 1:
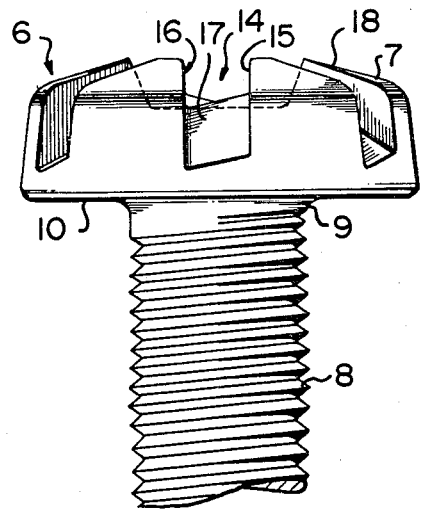
FIGURE 1 is a fragmentary elevational view of the screw of this invention, and illustrates the circumferential slope of the lower surfaces of the driving channels of the screw head.
Figure 3:
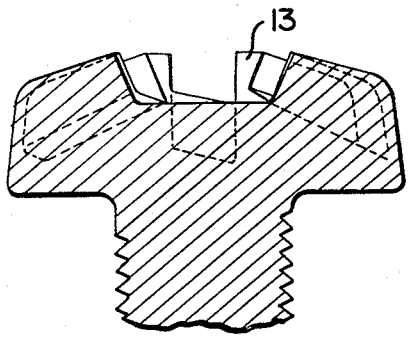
FIGURE 3 is a fragmentary vertical sectional view of the screw of this invention taken along the line 3—3 of FIGURE 2, and illustrates the inwardly sloping walls of the central screw head depression adapted to facilitate alignment of a driving tool.
Figure 2:
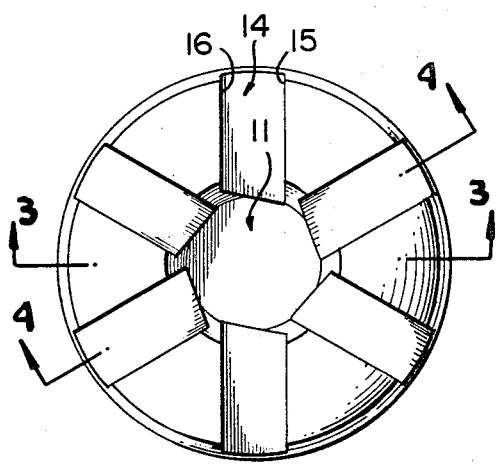
FIGURE 2 is a plan view of the head of the screw of FIGURE 1, and illustrates a central depression and six radial torque-transmitting channels of the screw head.
Figure 4:
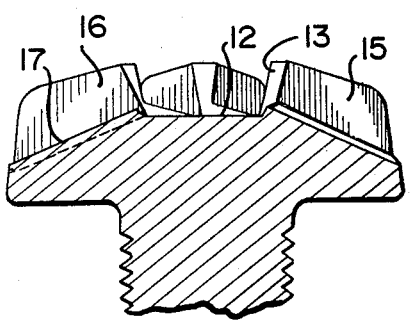
FIGURE 4 is a fragmentary vertical sectional view of the screw of this invention taken along the line 4—4 of FIGURE 2 and illustrates the bottom surfaces of the driving channels sloping radially outwardly and downwardly toward the base surface of the screw head.

Referring now to the drawing in detail, reference is first made to FIGURE 1 wherein there is illustrated a screw 6 having a head portion 7 and a shank 8. The screw shank 8 includes an upper portion 9 integrally joined to the screw head 7 adjacent a bottom surface 10 thereof.

The screw head portion 7 conforms to the over-all dimensions of any appropriate standard screw head, and includes a central depression 11 defined by a lower surface 12 and upwardly tapered wall surfaces 13 terminating adjacent an upper surface 18 of the screw head 7.

Six radially directed equidistantly spaced (60° apart) torque transmitting channels 14 emanate from the central depression 11, and have side walls 15, 16 and a bottom channel surface 17. The bottom channel surface 17 slopes radially outwardly and downwardly as well as circumferentially downwardly toward the bottom surface 10 of the head portion 7 of the screw 6. The side channel walls 16 which receive the driving torque from a driving tool (not shown) thereby present a greater surface area to the mating tool portion than the side channel walls 15. Thus, a greater surface area is presented to the driving tool at the radial outermost portion of the side channel walls 16, resulting in greater torque transmitting capabilities of the screw head portion 7 to the shank portion 8 of the screw 6. The side channel walls 15, 16 may be in a vertical plane as shown in FIGURE 1, or may be slightly sloped (not shown) as such may be desired, to facilitate entry and removal of the driving tool. Also, although the bottom channel surface 17 may be sloped or tapered with respect to the bottom surface 10 of the screw head 7 within an approximate range of 5° to 15°, it has been found that a circumferential slope of 10° for the bottom channel wall 17 produces the optimum torque transmitting capabilities of the screw head 6.

The side channel walls 15 of the screw head 7 present a somewhat reduced surface compared to the side channel walls 16 to enable the removal of the screw 6 by a tool used in reverse rotation to that applied to the side channel walls 16 by a driving element, but to enable the greatest torque to be transmitted in the driven direction of the screw.

In FIGURE 5 there is illustrated another screw of this invention, generally designated by the numeral 20, having a head 21 and a shank portion 22.

The screw head portion 21 has an upper surface 22 and a generally conical lower surface 23. There is a central depression 24 in the upper surface 22 of the screw head 21, defined by a lower surface 25 and upwardly tapered wall surfaces 26, terminating adjacent the upper surface 22 of the screw head 21.

Six radial equidistantly spaced (60° apart) torque transmitting channels 27 emanate from and communicate with the central depression 24, each of the channels 27 having sidewalls 28, 30 and a channel bottom surface 31. The sidewalls 28 and 30 of any particular channel 27 are generally parallel.

The channel bottom surface 31 slopes radially outwardly and downwardly, as is best viewed in FIGURE 7, away from the screw head upper surface 22, and toward the shank portion 22 of the screw 20. As viewed in FIGURE 7, the channel bottom surface 31 may also be defined as sloping radially outwardly and downwardly toward a plane disposed perpendicular to a longitudinal central axis of the screw 20, through the junction of the screw head 21 and shank 22, at an angle of approximately 25°.

Each channel bottom surface 31 also slopes circumferentially downwardly between the channel sidewalls 28 and 30, as is best viewed in FIGURE 6 of the drawings. The circumferential slope of this channel may more specifically be defined as sloping with respect to a plane which is perpendicular to the longitudinal central axis of the screw 20, at the junction of the screw head portion 21 and shank portion 22, and refining an angle with that plane, as viewed in the center of FIGURE 6 of the drawings, of approximately 10°. Thus, sidewall surface 28 presents a greater area than sidewall surface 30 to a driving member, due to the circumferential downward slope of the bottom surface 31.

Each channel 27 terminates at its radial outermost portion in an end wall 32, which leaves the conical or counter-sunk surface 23 of the head 21 unbroken, thus preventing undesirable scoring of a mating counter-sunk surface of an element in which the screw 20 is secured.

Although the drawings illustrate screws adapted to be driven in a clockwise direction, it is to be understood that should it be desired to provide a screw adapted to be driven in counterclockwise direction, the optimum torque transmitting capabilities of the screw head would be realized by tapering the bottom channel surfaces 17 circumferentially so that side channel walls 15 present a greater surface area than side channel walls 16 to facilitate the transmission of driving torque to the screw shank 8, of for example, screw 6.

I claim:

1. A screw having a head and a shank portion, said head terminating in a bottom surface adjacent said shank portion; a plurality of channels extending radially of a centermost portion of said head along an upper surface thereof; said channels being defined by upstanding wall surfaces at opposite sides of bottom sloping surfaces; said sloping surfaces extending towards said bottom surface of said head in radially outwardly increasing depth, including means for facilitating the greatest torque transmission through the screw head in the direction of tightening; said means including said bottom surfaces of said channels being sloped circumferentially toward said bottom surface of said screw head.

2. The screw of claim 1 wherein said wall surfaces are substantially prependicular to said bottom screw head surface.

3. The screw of claim 1 wherein said channels are substantially equidistantly peripherally spaced about the upper surface of said screw head and terminate at their radial innermost position at a central recessed portion of the screw head.

4. The screw of claim 3 wherein the channels are peripherally spaced substantially 60° apart.

5. The screw of claim 1 wherein said channels are of a minimum depth at their centermost portion.

6. The screw of claim 1 which is adapted to be driven in clockwise rotation by a non-aligned tool having a portion mating with the screw head; those wall surfaces which are subject to the greatest driving force having greater areas than said other wall surfaces; the radial outermost portions of said wall surfaces being adapted to transmit the greatest driving torque.

7. The screw of claim 1 wherein the circumferential downward slope of said channel bottom surface intersects the plane of said head bottom surface at an included angle within the range of 5° to 15°.

8. The screw of claim 1 wherein the circumferential downward slope of said channel bottom surface intersects the plane of said head bottom surface at an included angle of approximately 10°.

9. The screw of claim 1 wherein said bottom surface of said head is of generally conical configuration.

10. The screw of claim 9 wherein each said channel terminates at its radial outermost portion in an end wall portion.

11. The screw of claim 10 wherein said end wall portion connects channel side wall surfaces and wherein an outer surface of said end wall portion defines a portion of said conical head bottom surface.

12. The screw of claim 9 wherein channel end wall portions are provided having outer surfaces which partially define said conical undersurface.

13. The screw of claim 12 wherein said channels are equidistantly angularly spaced about said screw head and communicate centrally thereof in a central recessed portion of the screw head.

14. The screw of claim 12 wherein said channels cooperate to present a greater area for driving engagement in a direction of screw drive than in a direction of screw removal.

15. The screw of claim 18 wherein the channels are of a minimum depth at their centermost portion and each channel bottom surface has a first slope when measured in channel cross-section and a second slope relative to a plane disposed transverse to a longitudinal screw axis; and wherein said first slope defines an included angle with said plane of approximately 10°; said second slope defining an included angle with said plane of approximately 25°.

16. The screw of claim 1, said means also including that channel wall surface which intersects the channel bottom surface at the deepest side thereof being of greater area than the opposite channel wall surface.

17. A screw having a head and a threaded shank portion, said head terminating in a bottom surface adjacent said shank portion; a plurality of channels extending radially of a centermost portion of said head along an upper surface thereof; said channels being defined by upstanding wall surfaces at opposite sides of bottom sloping surfaces; said sloping surfaces extending toward said bottom surface of said head in radially outwardly increasing depth; wherein said bottom surfaces of said channels slope circumferentially toward said bottom surface of said screw head in the direction of thread pitch of said threaded shank portion.

References Cited

UNITED STATES PATENTS

| | | | |
|---|---|---|---|
| 2,015,878 | 10/1935 | Trotter | 85—45 |
| 2,180,633 | 11/1939 | Holt | 85—45 |
| 2,954,719 | 10/1960 | Vaughn | 85—45 |
| 3,178,988 | 4/1965 | Borup | 85—45 |
| 3,253,625 | 5/1966 | Oestereicher | 85—45 |
| 3,269,250 | 8/1966 | Curtiss | 85—45 |

FOREIGN PATENTS 1,232,468  4/1960  France.

MARION PARSONS, JR., *Primary Examiner.*

UNITED STATES PATENT OFFICE
CERTIFICATE OF CORRECTION

Patent No. 3,411,396                  November 19, 1968

William M. Herpich

It is certified that error appears in the above identified patent and that said Letters Patent are hereby corrected as shown below:

Column 4, line 54, the claim reference numeral "18" should read -- 13 --.

Signed and sealed this 24th day of March 1970.

(SEAL)
Attest:

Edward M. Fletcher, Jr.                  WILLIAM E. SCHUYLER, JR.
Attesting Officer                       Commissioner of Patents